(12) United States Patent
Zarkhin et al.

(10) Patent No.: US 10,587,193 B2
(45) Date of Patent: Mar. 10, 2020

(54) SYNCHRONOUS BUCK REGULATOR WITH SHORT CIRCUIT TO VOLTAGE SOURCE PROTECTION

(71) Applicant: Continental Automotive Systems, Inc., Auburn Hills, MI (US)

(72) Inventors: Mikhail Zarkhin, West Bloomfield, MI (US); Alfons Fisch, Falkenstein (DE)

(73) Assignee: Vitesco Technologies USA, LLC., Auburn Hills, MI (US)

( * ) Notice: Subject to any disclaimer, the term of this patent is extended or adjusted under 35 U.S.C. 154(b) by 38 days.

(21) Appl. No.: 14/690,586

(22) Filed: Apr. 20, 2015

(65) Prior Publication Data
US 2016/0308439 A1  Oct. 20, 2016

(51) Int. Cl.
*H02M 3/158* (2006.01)
*H02M 1/32* (2007.01)

(52) U.S. Cl.
CPC .......... *H02M 3/158* (2013.01); *H02M 1/32* (2013.01); *H02M 3/1588* (2013.01); *Y02B 70/1466* (2013.01)

(58) Field of Classification Search
CPC ........ H02M 1/32; H02M 3/1588; H02M 1/08; H02M 1/36; H02M 2001/0009; H02M 2001/322; H02M 3/156; H02M 3/158; H02M 3/3376; Y02B 70/1466
See application file for complete search history.

(56) References Cited

U.S. PATENT DOCUMENTS 3,978,393 A * 8/1976 Wisner ................ H02H 7/1213
323/272
6,246,200 B1 6/2001 Isham et al.
(Continued)

FOREIGN PATENT DOCUMENTS

CN     1286520 C    3/2001
CN  101540552 A    9/2009
(Continued)

OTHER PUBLICATIONS

French Search Report and Opinion, dated Aug. 31, 2017, for corresponding French patent application FR1600645.
(Continued)

*Primary Examiner* — Jue Zhang
*Assistant Examiner* — Henry E Lee, III

(57) ABSTRACT

A method and apparatus for a power converter assembly detects an over-current, latches off a low-side switch if an over-current is detected, holds the low-side switch latched off until a PWM controller provides a predetermined minimum pulse to the latch (for the duration of the over-current), and unlatches the low-side switch if a PWM controller provides a predetermined minimum pulse to the latch. A power converter assembly includes a PWM controller coupled to the main switch, the PWM controller configured to control the main switch according to a duty cycle. A latch is coupled with a secondary switch and configured to selectively turn off the secondary switch. The PWM controller is configured to provide a PWM control signal to the latch, and the control signal is configured to reset the latch to allow the secondary switch to turn on only when the PWM begins operating with a minimum pulse width.

21 Claims, 4 Drawing Sheets

(56) References Cited

U.S. PATENT DOCUMENTS

| | | | |
|---|---|---|---|
| 6,356,129 B1* | 3/2002 | O'Brien | H03K 5/00006 327/156 |
| 8,018,694 B1* | 9/2011 | Wu | H02M 1/32 361/18 |
| 2008/0037807 A1* | 2/2008 | Honda | H03F 1/52 381/120 |
| 2009/0237055 A1 | 9/2009 | Sakai et al. | |
| 2012/0032660 A1* | 2/2012 | Nakamura | H02M 3/156 323/288 |
| 2013/0229163 A1* | 9/2013 | Deng | H03K 17/082 323/299 |
| 2014/0253086 A1* | 9/2014 | Rosu-Hamzescu | H03K 17/0822 323/311 |

FOREIGN PATENT DOCUMENTS

| | | |
|---|---|---|
| EP | 2634820 A2 | 9/2013 |
| JP | 2005328671 A | 11/2005 |
| KR | 100573520 B1 | 4/2006 |
| WO | WO02014137786 A2 | 9/2014 |

OTHER PUBLICATIONS

Linear Technology, data sheet for Linear Technology part LTC3115-1, date unknown.

Linear Technology, data sheet for Linear Technology part LTC3115-2, date unkonwn.

Canfield, "2.7V to 40V Monolithic Buck-Boost DC/DC Expands Input Capabilities, Regulates Seamlessly through Automotive Cold-Crank and Load-Dump Transients", Lear Technology Journal of Analog Innovation, Jan. 2013.

Linear Technology, Press Release for Linear Technology part LTC3115-1, Nov. 21, 2011.

Korean Office Action dated Nov. 14, 2017 for corresponding Korean patent application No. 10/2016-0047830.

Chinese Office Action dated Mar. 29, 2018 for corresponding Chinese application 201610344305.3.

\* cited by examiner

SYNCHRONOUS BUCK REGULATOR WITH SHORT CIRCUIT TO VOLTAGE SOURCE PROTECTION

FIELD

This application relates generally to electronic power systems and, more particularly, to DC-to-DC converter assemblies and methods.

BACKGROUND

A power supply is integrated into nearly every electronic device, both consumer and industrial, including vehicle powertrain electronics, portable electronic equipment, integrated in-vehicle systems, computers, medical instrumentation, and many other devices. Within an electronic device, it may be necessary to either increase or decrease a voltage by using either a step-up or a step-down power converter (called a buck or boost). A step-up, or boost, converter can be used to increase voltage, and a step-down, or buck, converter can be used to decrease voltage.

Short circuits of the output voltage node, however, can cause the power converter assembly not to operate properly. Thus, short circuit to ground solutions have been implemented by those of skill in the art.

In certain conditions, however, the output voltage node may be shorted to a different voltage rail, or a non-ground, which is higher than the output voltage and lower than the input voltage and nevertheless can cause a rise of the input voltage node. This can damage electronics connected to the input voltage node and/or the MOSFETs or other switches used in the converter. For example, in a synchronous buck regulator, the catch diode is replaced by a low-side switch, the control of which is complimentary to the high-side switch. Since, unlike the diode, the low-side switch when turned on can conduct current in both directions, it needs to be protected in case of the output short circuit to a voltage rail. This type of failure will cause reverse current into the buck regulator output, which is only limited by the DC resistance of the buck inductor. At some point the over-current protection of the low side switch will turn it off and the current will start to decay. If this process will repeat over and over, the low-side switch together with the buck inductor, body diode of the high-side switch, and the input capacitor will create a boost topology that will transfer energy from the output to the input. If the pre-regulator stage feeding the synchronous buck regulator can only source current and does not have enough loading, then the voltage at the input capacitor will build up to possibly unsafe higher levels.

Accordingly, there is a need for a low-cost and easily implemented solution for a synchronous buck converter assembly that is capable of effectively protecting against a short circuit to an outside voltage source.

SUMMARY OF THE INVENTION

A power converter assembly is provided that helps protect against the input capacitor building up unsafe current levels if the output is shorted to an outside voltage source.

In one form, which may be combined with or separate from other forms described herein, a power converter assembly is provided. The power converter assembly includes an input node, a main high-side switch coupled in series with the input node, and a pulse-width modulation (PWM) controller coupled to the main switch. The PWM controller is configured to control the main switch according to a duty cycle calculated by the feedback loop. An inductor is coupled in series with the main switch, and an output node is coupled in series with the inductor. A secondary low-side switch is coupled in series with the main switch and with the inductor. The secondary switch is coupled to ground to provide for synchronous buck converter architecture and has a short circuit protection function. A latch is coupled with the secondary switch and configured to selectively turn off the secondary switch. An over-current detector is configured to detect an over-current and to set the latch to turn off the secondary switch when an over-current is detected. The PWM controller is configured to provide a PWM control signal to the main switch and to the latch, wherein the control signal is configured to reset the latch to turn on the secondary switch, and wherein the latch is configured to remain set after being set by the over-current detector until the latch receives the control signal from the PWM controller and is reset.

In another form, which may be combined with or separate from the other forms provided therein, a method of protecting against a short circuit to voltage in a power converter assembly is provided. The method includes detecting an over-current with an over-current detector, latching off a low-side switch if the over-current detector detects an over-current (using a latch), holding the low-side switch latched off until a PWM controller provides a predetermined minimum pulse to the latch, and unlatching the low-side switch if a PWM controller provides the predetermined minimum pulse to the latch.

In yet another form, which may be combined with or separate from the other forms described herein, a method of protecting against a short circuit to voltage in a power converter assembly is provided. The method includes the steps of: detecting an over-current with an over-current detector; latching off a low-side switch if the over-current detector detects an over-current; and keeping the low-side switch latched for the duration of the short circuit to voltage.

In still another form, which may be combined with or separate from the other forms described herein, a non-transitory machine-readable medium is provided. The non-transitory machine-readable provides instructions, which when executed by a machine, cause the machine to perform the following operations: detecting an over-current with an over-current detector; latching off a low-side switch with a latch if the over-current detector detects an over-current; holding the low-side switch latched off until a PWM controller provides a predetermined minimum pulse to the latch; and unlatching the low-side switch if a PWM controller provides a predetermined minimum pulse to the latch.

These and other features can be best understood from the following specification and drawings, the following of which is a brief description.

BRIEF DESCRIPTION OF THE DRAWINGS

The following drawings are provided for illustrative purposes only and are not intended to limit the invention, as defined in the claims.

DETAILED DESCRIPTION OF THE PREFERRED EMBODIMENT

Figure 1A:
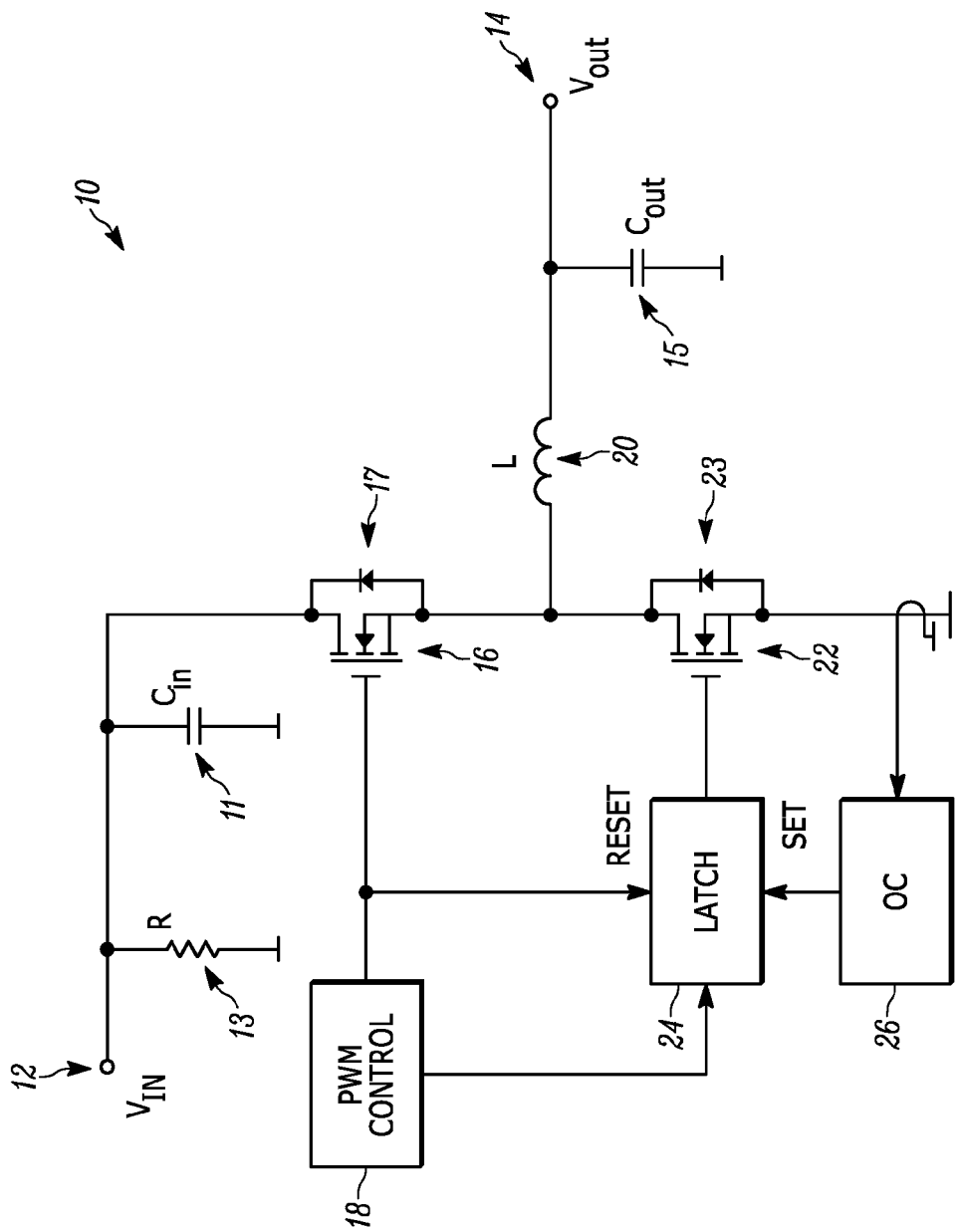
FIG. 1A is a schematic diagram illustrating components of a power converter assembly, in accordance with the principles of the present disclosure.

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

With reference to FIG. 1, a power converter assembly for decreasing a DC voltage is illustrated and generally designated at 10. The power converter assembly 10 is a synchronous buck regulator configured to step-down the voltage applied to an input of the power converter assembly 10, according to a duty cycle. With the normal operation of the power converter assembly 10, a DC voltage is input into an input node 12 of the power converter assembly 10 and is transformed into a lower DC voltage that is provided through the output node 14, according to the following equation (in basic form):

$$V_{OUT}=\text{D-Cycle}*V_{IN},$$

where $V_{IN}$ is the voltage input to the input node 12, D-Cycle is the duty cycle (which is a positive number always less than or equal to 1), and $V_{OUT}$ is the voltage provided from the output node 14. In some applications, an input voltage of 6 V may be supplied to the input node 12, by way of example. A capacitor 11 and a resistor 13 are coupled with the input node 12, and the capacitor 11 and the resistor 13 are disposed in parallel with each other. Each of the resistor 13 and the input capacitor 11 are coupled to ground. An output capacitor 15 may be coupled with the output node 14 and to ground.

The power converter assembly 10 includes a main switch 16, or high-side switch, coupled in series with the input node 12. The main switch 16 may be a transistor, such as a MOSFET. The main switch 16 may have a main body diode 17 disposed in parallel with the main switch 16. The main body diode 17 is configured to conduct current toward the input node 12.

A pulse-width modulation (PWM) controller 18 coupled to the main switch 16. The PWM controller 18 is configured to control the main switch 16 ON and OFF according to a duty cycle calculated by a feedback loop.

An inductor 20, or an inductive winding, is coupled in series with the main switch 16. When the main switch 16 is open, or off, no current will flow from the input node 12 to the inductor 20. When the main switch 16 is closed (on), however, current will begin to increase and to flow to the inductor 20. The inductor 20 will produce an opposing voltage across its terminals in response to the changing current. This voltage drop counteracts the voltage of the source, reducing the net voltage. Over time, the inductor 20 will store energy in the form of a magnetic field. The inductor 20 is coupled in series with the output node 14.

A secondary switch 22, or low-side switch, is coupled in series with the main switch 16 and with the inductor 20. As shown, the secondary switch 22 is coupled to ground. The secondary switch 22 may have a secondary body diode 23 disposed in parallel with the secondary switch 22. The secondary body diode 23 is configured to conduct current toward the main switch 16 and the inductor 20.

When the main switch 16 is open (off), the secondary switch 22 will normally be closed (on), and vice versa; in other words, the main switch 16 and the secondary switch 22 are out of phase with each other. When the main switch 16 is open, current will continue to flow through the inductor 20, output node 14, buck converter load and return through ground and through the closed secondary switch 22. The inductor 20 then discharges energy stored in magnetic field into the load at the output.

Current can flow in both directions through the secondary switch 22 when it is closed. Accordingly, in a situation where the output node 14 is shorted to a voltage rail, such as, e.g., a 1.2 V or a 3.3 V nearby voltage rail, energy may be supplied from that voltage rail back to the input node 12. In such a situation, without the improvements described below, the power converter assembly 10 would become a boost power converter in the opposite direction where a higher voltage would be supplied back to the input capacitor 11 and the input node 12. The current in the input capacitor 11 could then rise to unsafe levels and damage electronics connected to the input node 12.

Accordingly, when the output node 14 is shorted to a voltage that is in between the desired input and output voltages ($V_{OUT}<V_{SHORT}<V_{IN}$), components of the present power converter 10 protect against the situation described above, where components may see a rise in current to unsafe levels. A latch 24 is coupled with the secondary switch 22 and is configured to selectively turn off the secondary switch 24. An over-current detector 26 is configured to detect an over-current coming through the secondary switch 22 and to set the latch 24 to turn off the secondary switch 22 when an over-current is detected. Therefore, the latch 24 will override the normal complimentary nature of the main switch 16 and the secondary switch 22, because in an over-current situation, both the main switch 16 and the secondary switch 22 may be off, or open.

The latch 24 is configured to remain set for the duration of the voltage short, and therefore, to keep the secondary switch 22 latched open. The PWM controller 18 is configured to provide the PWM control signal to the latch 24 (at the same time as it provides the PWM control signal to the main switch 16). The PWM control signal is configured to reset the latch 24 to close and turn on the secondary switch 22. Thus, the latch 24 is configured to remain set after being set by the over-current detector 26 until the latch 24 receives the control signal from the PWM controller 18 and is reset. If the voltage exceeds the desired output voltage, however, no PWM signal will be sent from the PWM controller 18 to the main switch 16 or the latch 24. Accordingly, no reset of the latch 24 will occur until the PWM control signal is sent.

For example, when the fault condition is removed, the output capacitor 15 will naturally discharge and at some point in time, the output voltage will drop. After the output voltage drops, the control loop will resume the operation of the main switch 16. At that particular moment, the latch 24 will be reset and the secondary switch 22 will then close after the main switch 16 reopens. Accordingly, no reset of the latch 24 will occur until it is safe to re-close the secondary switch 22, which is only after the main switch 16 is closed and then opened.

Figure 1B:
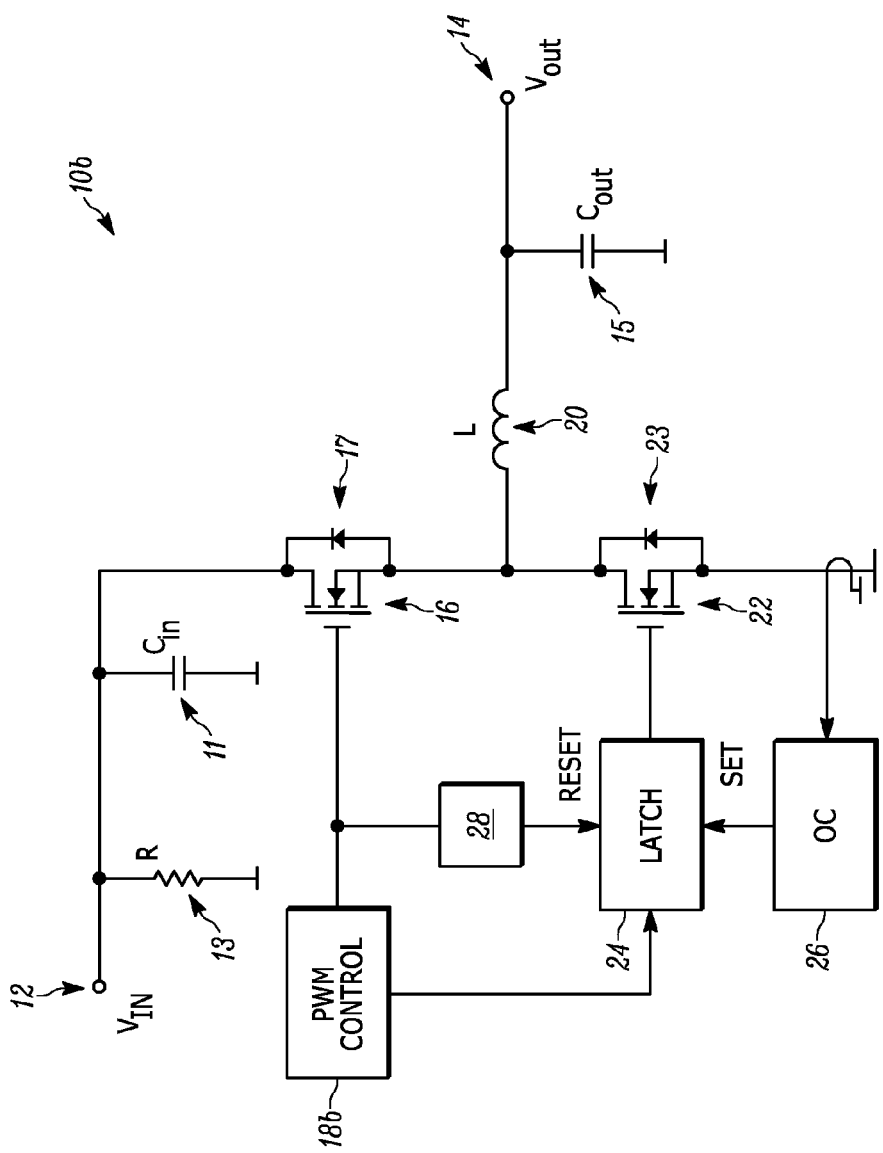
FIG. 1B is a schematic diagram illustrating components of another power converter assembly, in accordance with the principles of the present disclosure.

Referring now to FIG. 1B, a variation of a power converter assembly is illustrated and generally designated at 10b. The power converter assembly 10b has similar components to the power converter assembly 10, such as an input node 12, a resistor 13, an input capacitor 11, a main switch 16, a main body diode 17, an inductor 20, an output node 14, an output capacitor 15, a secondary switch 22, a secondary body diode 23, a latch 24, and an over-current detector 26. These components may be the same as described above with respect to FIG. 1A.

The power converter assembly 10b has a PWM controller 18b, which is similar to the PWM controller 18, except that the PWM controller 18b has a minimum duty cycle, in that it is always running at some non-zero minimum duty cycle. Therefore, to prevent the latch 24 from being reset by the minimum duty cycle, a discriminator 28 is disposed in series between the PWM controller 18b and the latch 24. The discriminator 28 prevents very short pulses associated with the minimum duty cycle from resetting the latch 24. Accordingly, the latch 24 will only be reset when the power converter assembly 10b is operating normally and there is no short to a non-zero voltage.

Figure 2:
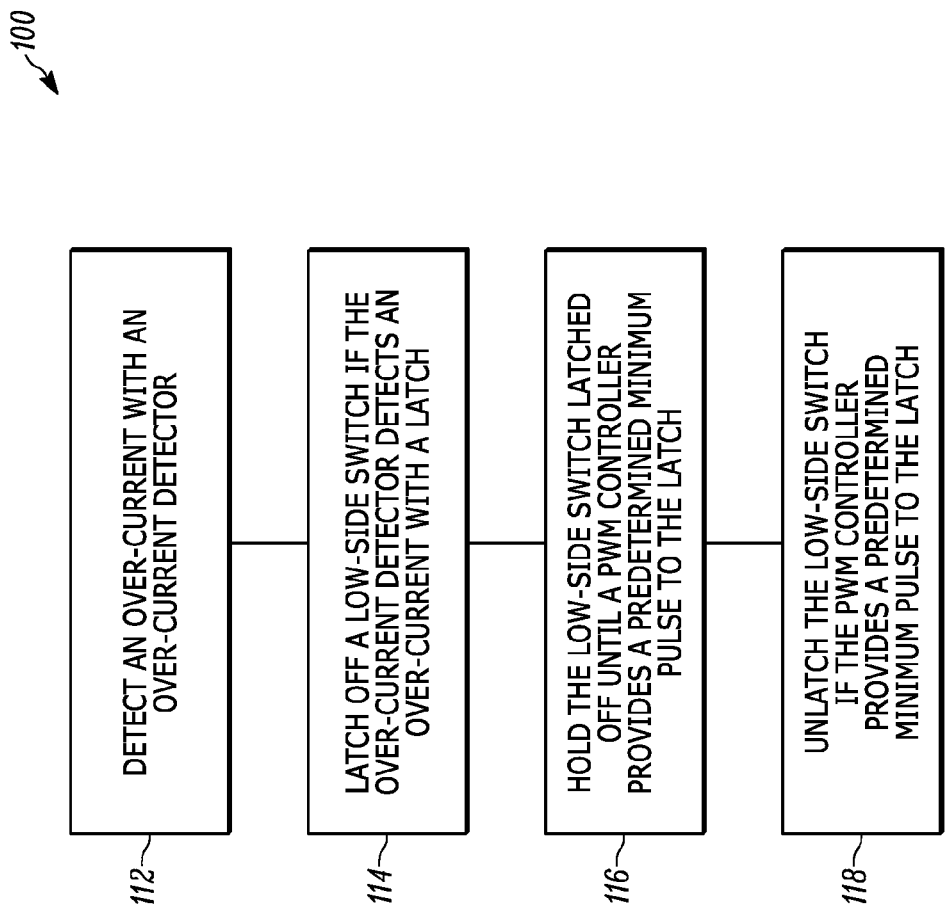
FIG. 2 is a block diagram illustrating a method of protecting against a short circuit to voltage in a power converter assembly, according to the principles of the present disclosure.

Referring now to FIG. 2, a method of protecting against a short circuit to voltage in a power converter assembly is illustrated and generally designated at 100. The method 100 may be used with one of the power converter assemblies 10, 10b illustrated and described above, though the method 100 need not necessarily use the power converter assemblies 10, 10b.

The method 100 includes a step 112 of detecting an over-current with an over-current detector, such as the over-current detector 26. The method 100 includes another step 114 of latching off a low-side switch if the over-current detector detects an over-current with a latch. For example, the latch 24 may be used to latch off the low-side switch 22. The method 100 further includes a step 116 of holding the low-side switch latched off until a PWM controller provides a predetermined minimum pulse to the latch. Finally, the method 100 includes unlatching the low-side switch if a PWM controller provides a predetermined minimum pulse to the latch. This may be any minimum pulse, such as described with respect to FIG. 1A, or a minimum pulse that is above the minimum pulse of the PWM controller, such as described with respect to FIG. 1B.

The method 100 may include additional steps, such as providing a DC current to an input node, as described above. The method 100 may also include providing the PWM controller as being operable according to duty cycle. The method may further include providing a high-side switch in series with the input node and with the PWM controller, the PWM controller being provided as operable to control the high-side switch according to the duty cycle.

In addition, the method 100 may include providing other components, such as those shown and described with respect to FIG. 1A. For example, the method 100 may include providing an inductor coupled in series with the high-side switch and an output node coupled in series with the inductor; providing the low-side switch as being coupled in series with the high-side switch and with the inductor; providing the low-side switch as being coupled to ground; and providing the latch as being coupled with the low-side switch. Also, the method 100 may include providing a resistor and an input capacitor coupled with the input node; providing the resistor and the input capacitor as being disposed in parallel with each other; coupling each of the resistor and the input capacitor to ground; providing a high-side diode disposed in parallel with the high-side switch; providing the high-side diode as being configured to conduct current toward the input node; providing a low-side diode disposed in parallel with the low-side switch; providing the low-side diode as being configured to conduct current toward the high-side switch and the inductor; and providing an output capacitor as being coupled with the output node and with ground. In some variations, the method 100 may also include providing a discriminator disposed in series between the PWM controller and the latch.

Figure 3:
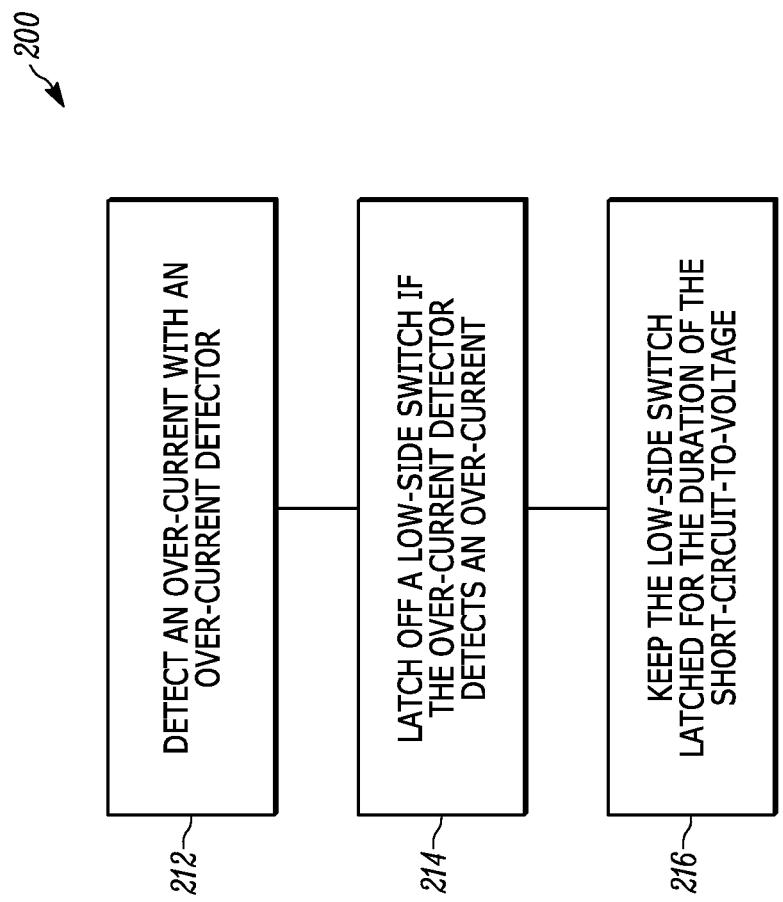
FIG. 3 is a block diagram illustrating a variation of a method of protecting against a short circuit to voltage in a power converter assembly, in accordance with the principles of the present disclosure.

Referring now to FIG. 3, a variation of a method of protecting against a short circuit to voltage in a power converter assembly is illustrated and generally designated at 200. The method 200 includes a step 212 of detecting an over-current with an over-current detector. The method 200 also includes a step 214 of latching off a low-side switch if the over-current detector detects an over-current. The method 200 then includes a step 216 of keeping the low-side switch latched for the duration of the short circuit to voltage. This may be accomplished, for example, as described above by resetting the latch 24 only with a minimum PWM control signal. Other steps of the method 200 may be similar to those described above with respect to the method 100 or the apparatuses 10, 10b.

In some variations, a non-transitory machine-readable medium is used that provides instructions, which when executed by a machine, cause the machine to perform operations. These operations may include the steps of one of the methods 100, 200, such as: detecting an over-current with an over-current detector; latching off a low-side switch with a latch if the over-current detector detects an over-current; holding the low-side switch latched off until a PWM controller provides a predetermined minimum pulse to the latch; and unlatching the low-side switch if the PWM controller provides a predetermined minimum pulse to the latch, by way of example. The machine may be further configured to perform the operations of receiving a DC current to an input node, the input node being coupled with a high-side switch, and operating the PWM controller according to duty cycle.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A power converter assembly, comprising:
   an input node;
   a main switch coupled in series with the input node, the main switch including a control terminal;
   a pulse-width modulation (PWM) controller coupled to the main switch, the PWM controller configured to control the main switch according to a duty cycle;
   an inductor coupled in series with the main switch;
   an output node coupled in series with the inductor;
   a secondary switch coupled in series with the main switch and with the inductor, the secondary switch coupled to ground, the secondary switching including a control terminal;
   a latch coupled with the secondary switch and configured to selectively turn off the secondary switch, the latch including a reset input, a set input, a control input and an output, the output of the latch is connected to the control terminal of the secondary switch; and
   an over-current detector configured to detect an over-current coming through the secondary switch and to set the latch to turn off the secondary switch when the over-current is detected,
   wherein the PWM controller has a first output connected to the control terminal of the main switch and the reset input of the latch, and a second output connected to the control input of the latch, the PWM controller configured to provide a first PWM control signal both to the main switch and to the reset input of the latch and to provide a second PWM control signal, the first PWM control signal being configured to both reset the to turn on the secondary switch, and to and turn on and off the main switch, the secondary switch also being turned on and off based upon the second PWM control signal, the latch remaining set after being set by the over-current detector until the latch receives the first PWM control signal from the PWM controller and is reset by the PWM controller.

2. The power converter assembly of claim 1, further comprising a resistor and an input capacitor coupled with the input node, the resistor and the input capacitor being disposed in parallel with each other, each of the resistor and the input capacitor being coupled to ground.

3. The power converter assembly of claim 2, further comprising a main diode disposed in parallel with the main switch, the main diode being configured to conduct current toward the input node.

4. The power converter assembly of claim 3, further comprising a secondary diode disposed in parallel with the secondary switch, the secondary diode being configured to conduct current toward the main switch and the inductor.

5. The power converter assembly of claim 4, further comprising an output capacitor coupled with the output node and with ground.

6. The power converter assembly of claim 5, the PWM controller being operable to send the first control signal as an input pulse, the input pulse being operable to turn the main switch ON and OFF.

7. The power converter assembly of claim 1, further comprising a discriminator disposed in series between the PWM controller and the reset input of the latch, the discriminator preventing pulses in the first PWM control signal having a width less than a predetermined amount from being provided to the reset input of the latch.

8. The power converter assembly of claim 1, wherein the main switch is a MOSFET and the secondary switch is a MOSFET.

9. The power converter assembly of claim 1, wherein the power converter assembly is operable to decrease a DC voltage input to the output node, the power converter assembly being operable to output a DC voltage from the output node.

10. A power converter assembly, comprising:
    an input node;
    a main switch coupled in series with the input node, the main switch including a control terminal, a first conduction terminal coupled to the input node and a second conduction terminal;
    an inductor having a first terminal coupled to the second conduction terminal of the main switch and a second terminal;
    an output node coupled in series with the inductor;
    a secondary switch having a control terminal, a first conduction terminal coupled to the second terminal of the main switch and a second conduction terminal coupled to a ground reference;
    a latch having a reset input, a set input, a control input and an output, the output of the latch being coupled to the control terminal of the secondary switch;
    a pulse-width modulation (PWM) controller coupled to the main switch and the latch, the PWM controller configured to control the main switch according to a duty cycle;
    an over-current detector configured to detect an over-current passing through the secondary switch, the over-current detector having an output coupled to the set input of the latch to set the latch to turn off the secondary switch when the over-current is detected,
    wherein the PWM controller has a first output connected both to the control terminal of the main switch and to the reset input of the latch, and a second output connected to the control input of the latch, the PWM controller configured to provide a first PWM control signal both to the main switch and to the reset input of the latch and to provide a second PWM control signal, the first PWM control signal being configured to both reset the latch for turning on the secondary switch and to and turn on and off the main switch, the secondary switch also being turned on an off based upon the second PWM control signal, and the latch being remaining set after being set by the over-current detector until the latch receives the first PWM control signal from the PWM controller and is reset by the PWM controller.

11. The power converter assembly of claim 10, further comprising a discriminator disposed in series between the PWM controller and the reset input of the latch, the discriminator preventing pulses in the first PWM control signal having a width less than a predetermined amount from being provided to the reset input of the latch.

12. The power converter assembly of claim 10, wherein the first PWM control signal from the PWM controller resets the latch only after the first PWM control signal turns on and then turns off the main switch.

13. The power converter assembly of claim 10, wherein the first PWM control signal from the PWM controller resets the latch only after the first PWM control signal turns on the main switch, the latch being reset by the first PWM control signal allowing the secondary switch to turn on and off based upon the second PWM control signal.

14. The power converter assembly of claim 10, further comprising a resistor and an input capacitor coupled with the input node, the resistor and the input capacitor being disposed in parallel with each other, each of the resistor and the input capacitor being coupled to ground, and further comprising an output capacitor coupled with the output node and with ground.

15. The power converter assembly of claim 10, wherein the main switch operates independently of the output of the latch.

16. The power converter assembly of claim 1, wherein the first PWM control signal from the PWM controller resets the latch only after the first PWM control signal turns on and then turns off the main switch.

17. The power converter assembly of claim 1, wherein the first PWM control signal from the PWM controller resets the latch only after the first PWM control signal turns on the main switch, the latch being reset by the first PWM control signal allowing the secondary switch to turn on and off based upon the second PWM control signal.

18. The power converter assembly of claim 1, wherein the main switch operates independently of the output of the latch.

19. The power converter assembly of claim 10, wherein an output signal at the output of the latch is provided to the control terminal of the secondary switch without being provided to the control terminal of the main switch.

20. The power converter assembly of claim 1, wherein an output signal at the output of the latch is provided to the control terminal of the secondary switch without being provided to the control terminal of the main switch.

21. A power converter assembly, comprising:
an input node for receiving a DC voltage;
a high side switch coupled in series with the input node, the high side switch including a control terminal, a first conduction terminal coupled to the input node and a second conduction terminal;
an inductor having a first terminal coupled to the second conduction terminal of the main switch and a second terminal;
an output node coupled in series with the inductor;
a low side switch having a control terminal, a first conduction terminal coupled to the second terminal of the high side switch and a second conduction terminal coupled to a ground reference;
a latch having a reset input, a set input, a control input and an output, the output of the latch being coupled to the control terminal of the low side switch;
a pulse-width modulation (PWM) controller coupled to the high side switch and the latch, the PWM controller configured to control the low side switch according to a duty cycle;
an over-current detector configured to detect an over-current passing through the low side switch, the over-current detector having an output coupled to the set input of the latch to set the latch to turn off the low side switch when the over-current is detected,
wherein the PWM controller has a first output coupled both to the control terminal of the high side switch and to the reset input of the latch, and a second output coupled to the control input of the latch, the PWM controller configured to provide a first PWM control signal both to the high side switch and to the reset input of the latch and to provide a second PWM control signal, the first PWM control signal being configured to both reset the latch for turning on the low side switch and to and turn on and off the high side switch, the low side switch also turned on and off based upon the second PWM control signal, and the latch remaining set after being set by the over-current detector until the latch receives the first PWM control signal from the PWM controller and is reset.

* * * * *